United States Patent
Oh

(10) Patent No.: US 10,054,458 B2
(45) Date of Patent: Aug. 21, 2018

(54) VEHICLE AND METHOD OF CONTROLLING THE SAME

(71) Applicant: Hyundai Motor Company, Seoul (KR)

(72) Inventor: Se Min Oh, Incheon (KR)

(73) Assignee: Hyundai Motor Company, Seoul (KR)

( * ) Notice: Subject to any disclaimer, the term of this patent is extended or adjusted under 35 U.S.C. 154(b) by 183 days.

(21) Appl. No.: 14/958,374

(22) Filed: Dec. 3, 2015

(65) Prior Publication Data

US 2017/0010117 A1    Jan. 12, 2017

(30) Foreign Application Priority Data

Jul. 10, 2015 (KR) .................. 10-2015-0098475

(51) Int. Cl.
*G01C 21/34* (2006.01)
*G06K 9/00* (2006.01)
*G01C 21/36* (2006.01)

(52) U.S. Cl.
CPC ..... *G01C 21/3492* (2013.01); *G01C 21/3602* (2013.01); *G06K 9/00818* (2013.01)

(58) Field of Classification Search
CPC ............ G01C 21/3492; G01C 21/3602; G06K 9/00818
See application file for complete search history.

(56) References Cited

U.S. PATENT DOCUMENTS

| 6,266,442 B1* | 7/2001 | Laumeyer | G06K 9/00818 |
| | | | 382/104 |
| 2001/0023389 A1* | 9/2001 | Hosokai | G01C 21/28 |
| | | | 701/532 |
| 2009/0041304 A1* | 2/2009 | Bradai | G08G 1/09623 |
| | | | 382/104 |
| 2010/0188288 A1* | 7/2010 | Bahlmann | B60W 30/146 |
| | | | 342/357.23 |
| 2015/0193663 A1* | 7/2015 | Oh | G06K 9/00818 |
| | | | 382/104 |
| 2015/0302747 A1* | 10/2015 | Ro | G08G 1/096783 |
| | | | 340/905 |
| 2016/0012307 A1* | 1/2016 | Morishita | G06K 9/4661 |
| | | | 348/148 |

(Continued)

FOREIGN PATENT DOCUMENTS

| JP | 2005-128790 A | 5/2005 |
| JP | 2012-062034 A | 3/2012 |

(Continued)

*Primary Examiner* — Thomas G Black
*Assistant Examiner* — Sze-Hon Kong
(74) *Attorney, Agent, or Firm* — Mintz Levin Cohn Ferris Glovsky and Popeo, P.C.; Peter F. Corless

(57) ABSTRACT

A vehicle and a method of controlling the vehicle are provided. The vehicle includes an image capture unit that is configured to acquire image information by imaging a forward view of the vehicle and an imaging device controller that is configured to determine whether a traffic sign that indicates speed limit information of a road is recognized abnormally based on the acquired image information. A navigation controller is configured to display either speed limit information stored in an imaging device database or speed limit information of the road stored in a map database in response to determining that the traffic sign is recognized abnormally.

17 Claims, 12 Drawing Sheets

(56) References Cited

U.S. PATENT DOCUMENTS

| | | | |
|---|---|---|---|
| 2016/0104049 A1* | 4/2016 | Stenneth | G06K 9/72 |
| | | | 382/155 |
| 2016/0117562 A1* | 4/2016 | Chung | G06K 9/00818 |
| | | | 382/104 |
| 2016/0275792 A1* | 9/2016 | Takiguchi | G08G 1/09623 |
| 2016/0275793 A1* | 9/2016 | Yokochi | G06K 9/00818 |
| 2016/0321511 A1* | 11/2016 | Abhau | G06K 9/00818 |
| 2016/0347313 A1* | 12/2016 | Inoue | B60W 30/146 |
| 2017/0154554 A1* | 6/2017 | Tanaka | G06K 9/00798 |
| 2017/0243483 A1* | 8/2017 | Kaneshige | G08G 1/09623 |
| 2017/0259820 A1* | 9/2017 | Takahashi | B60W 30/165 |

FOREIGN PATENT DOCUMENTS

| | | |
|---|---|---|
| JP | 2012-185076 A | 9/2012 |
| JP | 2012-224247 A | 11/2012 |
| JP | 2015-102898 A | 6/2015 |
| JP | 2010-092403 A | 10/2015 |
| KR | 10-1089650 | 3/2011 |

\* cited by examiner

VEHICLE AND METHOD OF CONTROLLING THE SAME

CROSS-REFERENCE TO RELATED APPLICATION(S)

This application claims the benefit of Korean Patent Application No. 10-2015-0098475, filed on Jul. 10, 2015 in the Korean Intellectual Property Office, the disclosure of which is incorporated herein by reference.

BACKGROUND

1. Field of the Disclosure

The present disclosure relates a vehicle and a method of controlling the vehicle, and more particularly, to vehicles that provide information regarding driving environments and methods of controlling the same.

2. Description of the Related Art

Recently, navigation terminals have been embedded in vehicles. A navigation terminal provides a user with a route toward a destination and displays a variety of control screens related to operation of devices installed within a vehicle or screens related to additional functions executable by the navigation terminal. Accordingly, the user may operate the devices installed within the vehicle by manipulating the navigation terminal using a touchscreen display or a jog shuttle type controller. The navigation terminal also provides information regarding various driving environments such as speed limit information of roads along the route. In particular, information regarding driving environments that continuously changes may not reflect actual driving conditions.

SUMMARY

Additional aspects of the disclosure will be set forth in part in the description which follows and, in part, will be obvious from the description, or may be learned by practice of the disclosure.

In accordance with one aspect of the present disclosure, a vehicle may include an image capture unit configured to acquire image information by imaging a forward view of the vehicle, an imaging device controller configured to determine whether a traffic sign that indicates speed limit information of a road is normally recognized based on the acquired image information, and a navigation controller configured to display either speed limit information of the road stored in an imaging device database or speed limit information of the road stored in a map database upon determination that the traffic sign is not normally recognized.

The imaging device controller may be configured to analyze a cause of the abnormal traffic sign recognition and determine whether to display the speed limit information stored in the imaging device database based on results of the analysis. Additionally, the imaging device controller may be configured to analyze the cause of the abnormal traffic sign recognition based on at least one selected from the group consisting of operation of a windshield wiper, a sensing result of a rain sensor, and weather information received via a communication network. The cause of the abnormal traffic sign recognition may also be analyzed based on at least one selected from the group consisting of operation of a head lamp and time information when the traffic sign recognition is abnormally recognized. The imaging device controller may then be configured to determine whether the abnormal traffic sign recognition is caused by at least one selected from the group consisting of an object located around the road and malfunction of an imaging device. The cause of the abnormal traffic sign recognition may also be analyzed based on a driving speed of the vehicle.

At least one selected from the group consisting of position information, speed information, time information, and direction information of the vehicle when acquiring speed limit information of the road may be mapped to the speed limit information on a road basis and stored in the imaging device database. The imaging device controller may be configured to analyze the cause of the abnormal traffic sign recognition by comparing time information stored in the imaging device database and time information when the traffic sign is abnormally recognized. The navigation controller may be configured to determine whether the speed limit information of the road has changed by analyzing a cause of the abnormal traffic sign recognition and display either the speed limit information stored in the imaging device database or the speed limit information stored in the map database through at least one selected from the group consisting of a head-up display, a display, and an instrument cluster based on results of the determination.

In accordance with another aspect of the present disclosure, a vehicle may include an imaging device database in which speed limit information of a road is stored, an imaging device controller configured to determine whether the speed limit information of the road stored in the imaging device database has changed when speed limit information is not normally acquired from a traffic sign located around the road while driving, and a display device configured to display either the speed limit information stored in the imaging device database or speed limit information stored in a map database based on results of the determination. At least one selected from the group consisting of position information, speed information, time information, and direction information of the vehicle when acquiring speed limit information of the road may be mapped to the speed limit information on a road basis and stored in the imaging device database.

The imaging device controller may be configured to analyze a cause of an abnormal acquisition of the speed limit information from the traffic sign and determine whether the speed limit information stored in the imaging device database has changed based on results of the analysis. The imaging device controller may be configured to analyze the cause of the abnormal acquisition of the speed limit information based on at least one selected from the group consisting of operation of a windshield wiper, a sensing result of a rain sensor, and weather information received via a communication network and determine whether the speed limit information stored in the imaging device database has changed based on results of the analysis.

The imaging device controller may be configured to analyze the cause of the abnormal acquisition of the speed limit information based on at least one selected from the group consisting of operation of a head lamp and time information when the acquisition of the speed limit information is not normally acquired from the traffic sign located around the road and determine whether the speed limit information stored in the imaging device database has changed based on results of the analysis. The imaging device controller may further be configured to analyze the cause of the abnormal acquisition of the speed limit information based on at least one selected from the group consisting of an object located around the road and malfunction of an imaging device and determine whether the speed limit information stored in the imaging device database has changed based on results of the analysis. The imaging device controller may be configured to analyze the cause of the abnormal acquisition of the speed limit information based on a driving speed of the vehicle and determine whether the speed limit information stored in the imaging device database has changed based on results of the analysis.

Additionally, the imaging device controller may be configured to analyze the cause of the abnormal acquisition of the speed limit information by comparing time information when the speed limit information is stored in the imaging device database with time information when the speed limit information is not normally acquired and determine whether the speed limit information stored in the imaging device database has changed based on results of the analysis. The navigation controller may be configured to analyze the cause of the abnormal acquisition of the speed limit information and display either the speed limit information stored in the imaging device database or the speed limit information stored in the map database through at least one selected from the group consisting of a head-up display, a display, and an instrument cluster based on results of the analysis.

In accordance with another aspect of the present disclosure, adjacent vehicle may include an imaging device configured to acquire image information by imaging a forward view of the vehicle, and a controller configured to operate a device installed within the vehicle to display either speed limit information stored in an imaging device database or speed limit information stored in a map database when a traffic sign indicating speed limit information of a road is not normally recognized from the acquired image information.

In accordance with another aspect of the present disclosure, a method of controlling a vehicle may include acquiring image information by imaging a forward view of the vehicle, determining whether a traffic sign that indicates speed limit information of a road is normally recognized from the acquired image information, and operating a device installed within the vehicle to display either speed limit information stored in an imaging device database or speed limit information stored in a map database upon determination that the traffic sign is not normally recognized.

The determination may be performed by analyzing a cause of an abnormal traffic sign recognition and determining whether to display the speed limit information stored in the imaging device database based on results of the analysis. The determination may further be performed by analyzing the cause of the abnormal traffic sign recognition based on at least one selected from the group consisting of operation of a windshield wiper, a sensing result of a rain sensor, and weather information received via a communication network. Additionally, the determination may be performed by analyzing the cause of the abnormal traffic sign recognition based on at least one selected from the group consisting of operation of a head lamp and time information when the traffic sign recognition is not normally recognized. The determination may be performed by determining whether the abnormal traffic sign recognition is caused by at least one selected from the group consisting of an object located around the road and malfunction of an imaging device.

In accordance with a further aspect of the present disclosure, a method of controlling a vehicle may include storing speed limit information of a road in an imaging device database, determining whether the speed limit information of the road stored in the imaging device database has changed when speed limit information is not normally acquired from a traffic sign located around the road while driving, and displaying either the speed limit information stored in the imaging device database or speed limit information stored in a map database based on results of the determination.

The determination may be performed by analyzing a cause of the abnormal acquisition of the speed limit information based on a driving speed of the vehicle while driving and determining whether the speed limit information stored in the imaging device database has changed based on results of the analysis. The determination may further be performed by analyzing the cause of the abnormal acquisition of the speed limit information by comparing time information when the speed limit information is stored in the imaging device database with time information when the speed limit information is not normally acquired and determining whether the speed limit information stored in the imaging device database has changed based on results of the analysis.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Figure 1:
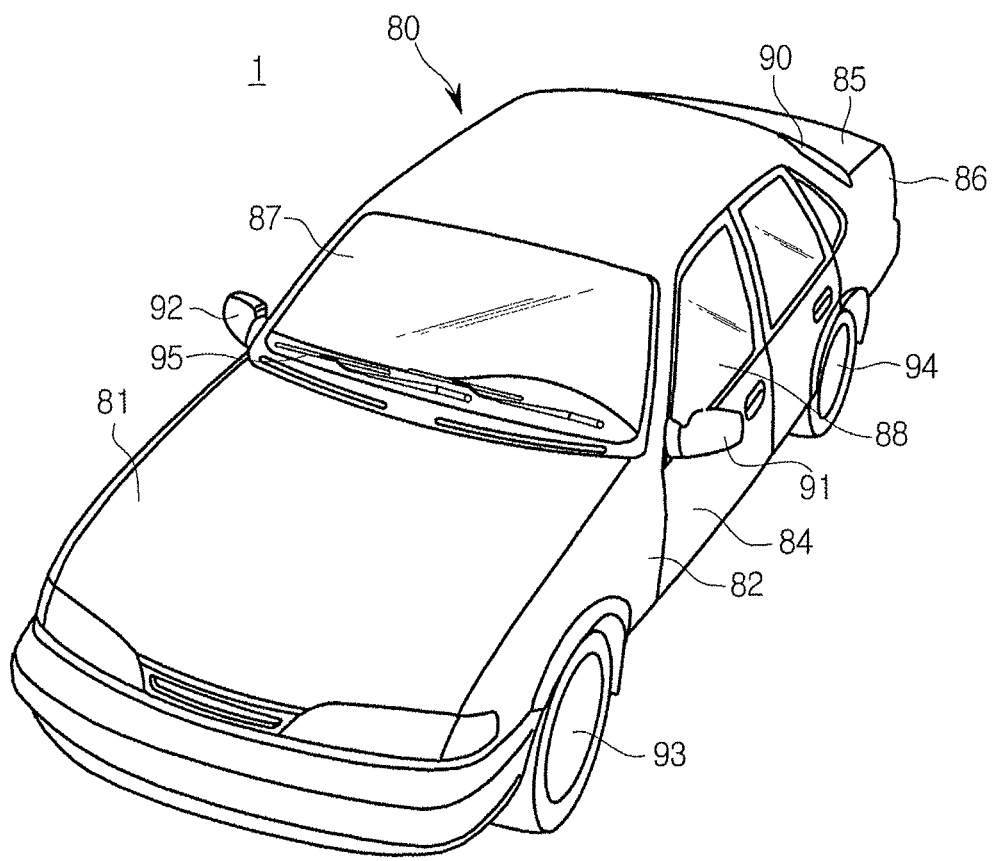
FIG. 1 is an exterior view of a vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present disclosure, examples of which are illustrated in the accompanying drawings, wherein like reference numerals refer to like elements throughout.

Figure 2:
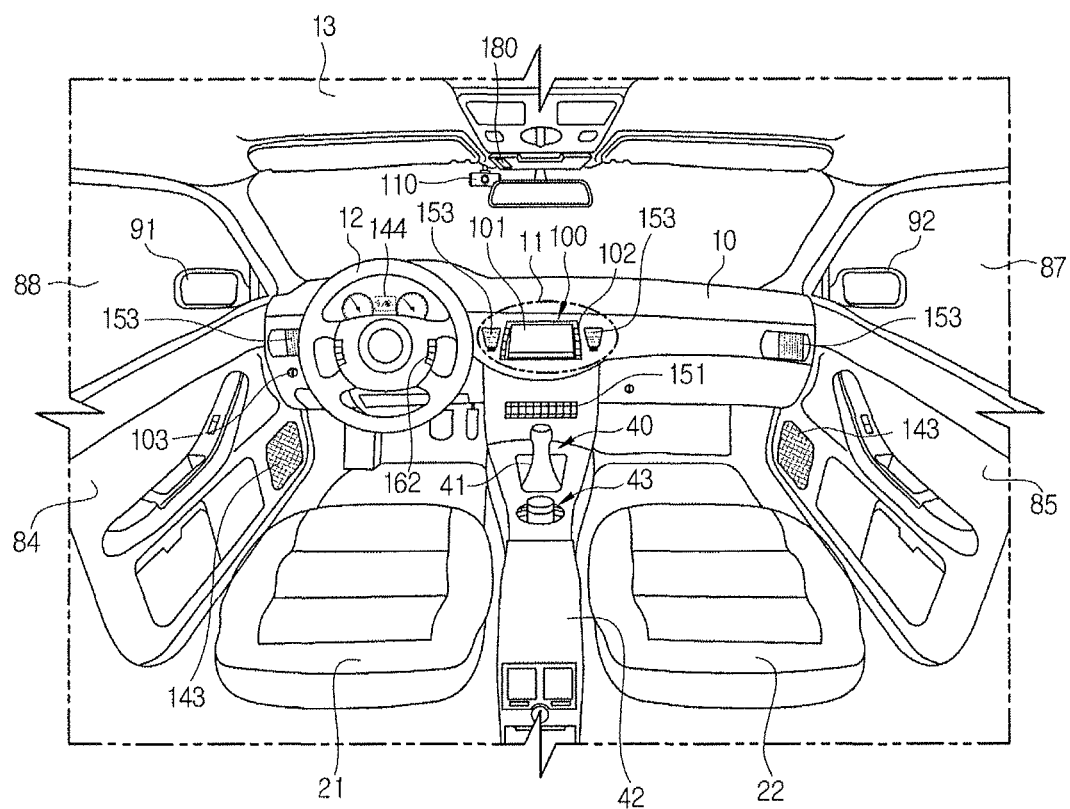
FIGS. 2 and 3 are interior views of vehicles according to different exemplary embodiments of the present invention.
Figure 3:
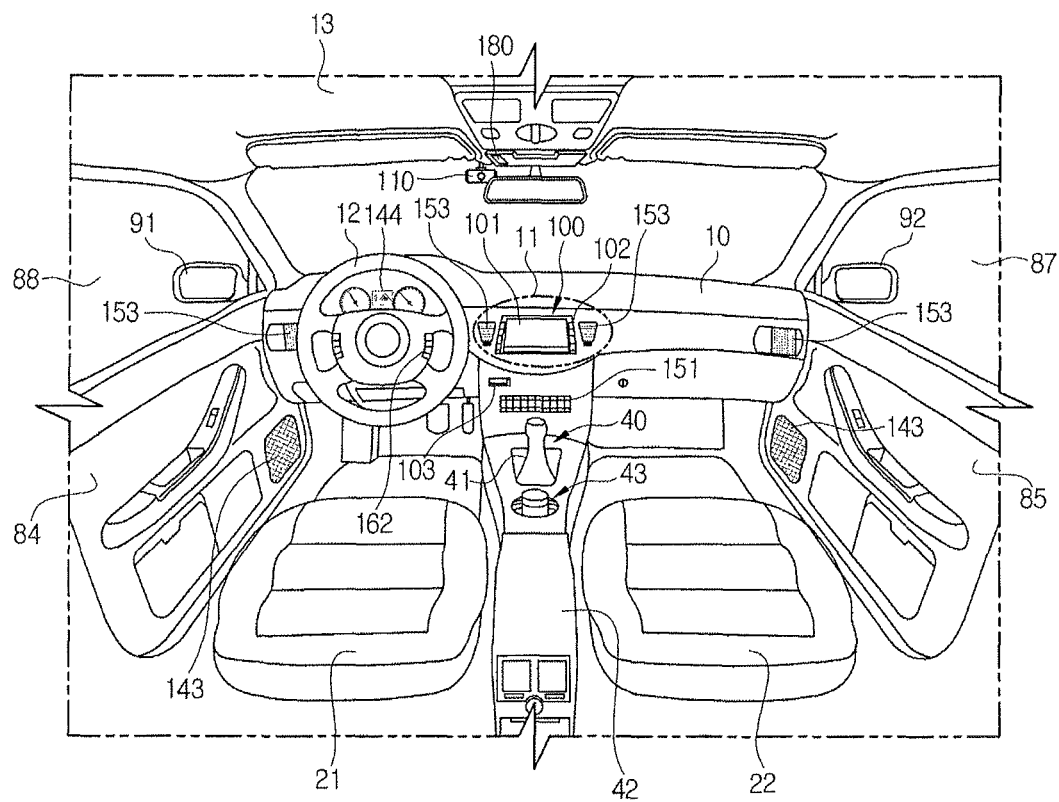
Figure 4:
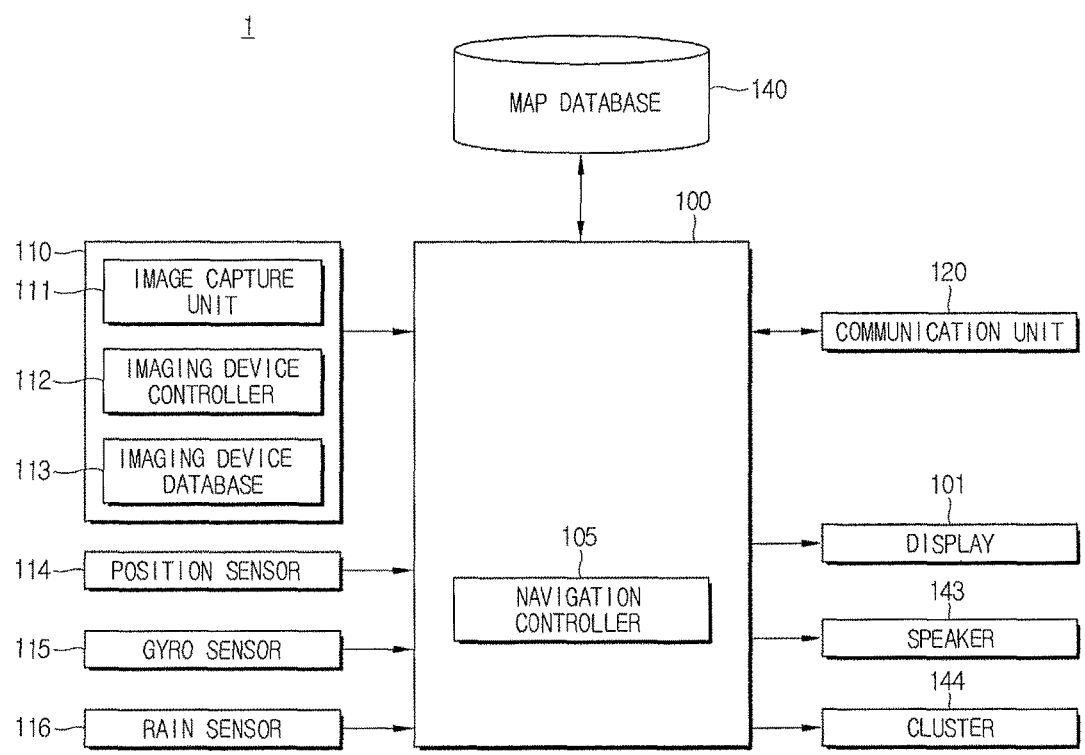
FIGS. 4 and 5 are control block diagrams of vehicles displaying speed limit information according to different exemplary embodiments of the present invention.
Figure 5:
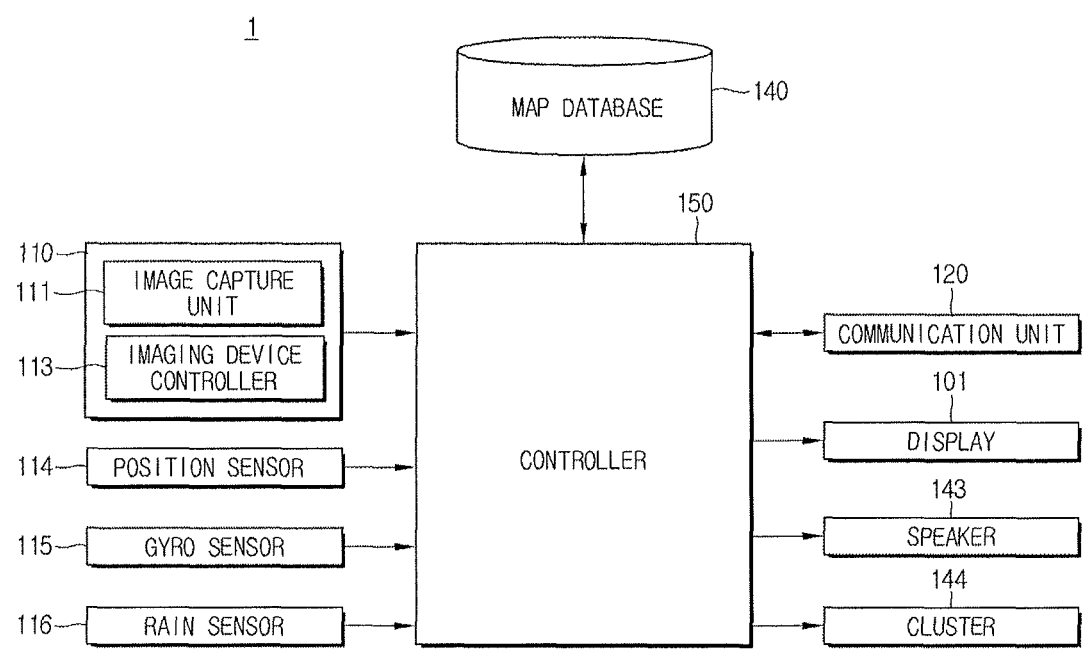

FIG. 1 is an exterior view of a vehicle according to an exemplary embodiment. FIGS. 2 and 3 are interior views of vehicles according to different exemplary embodiments. FIGS. 4 and 5 are control block diagrams of vehicles displaying speed limit information according to different exemplary embodiments. Hereinafter, these drawings will be described together to avoid duplication of description. Referring to FIG. 1, a vehicle 1 may include a body 80 defining an appearance of the vehicle 1 and wheels 93 and 94 that move the vehicle 1. The body 80 may include a hood 81, front fenders 82, doors 84, a trunk lid 85, quarter panels 86, and the like.

In particular, the exterior of the body 80 may include a front window 87 installed in a front portion of the body 80 and configured to provide a forward view of the vehicle 1, side windows 88 configured to provide side views, side mirrors 91 and 92 installed at the doors 84 and configured to provide rear views and side views of the vehicle 1, and a rear window 90 configured to provide a rear view of the vehicle 1. Hereinafter, the interior of the vehicle 1 will be described in detail. The vehicle 1 may include an air conditioner. The air conditioner described herein refers to an apparatus configured to adjust air conditioning environment such as indoor/outdoor environmental conditions of the vehicle 1, suction/discharge of air, air circulation, and cooling/heating states automatically or in response to a user control instruction. For example, the air conditioner mounted within the vehicle 1 may be configured to perform both heating and cool operations and adjust temperature in the vehicle 1 by discharging heated or cooled air through a discharge port 153.

Meanwhile, the vehicle 1 may include a navigation terminal 100. The navigation terminal 100 refers to an apparatus configured to provide navigation functions along a route toward a destination and to provide audio functions and video functions. In this regard, although the navigation terminal 100 may also be referred to as an audio video navigation (AVN) terminal, the navigation terminal will be used hereinafter for descriptive convenience. The navigation terminal 100 may be configured to selectively display at least one of an audio screen, a video screen, and a navigation screen, and display various control screens to operate the vehicle 1 and a screen related to additional functions performed by the navigation terminal 100, through a display 101.

According to an exemplary embodiment, the navigation terminal 100 may be configured to display various control screens related to the adjustment of the air conditioner via the display 101 in cooperation with the air conditioner. Additionally, the navigation terminal 100 may be configured to adjust the air conditioning environment in the vehicle 1 by operating the air conditioner. The navigation terminal 100 may also be configured to display or output a map that indicates a route toward the destination via the display 101, without being limited thereto. Meanwhile, the display 101 may be disposed at a center fascia 11 located at the center of a dashboard 10. According to an exemplary embodiment, the display 101 may be implemented using a liquid crystal display (LCD), a light emitting diode (LED), a plasma display panel (PDP), an organic light emitting diode (OLED), a cathode ray tube (CRT), or the like, without being limited thereto.

The vehicle 1 may further include a speaker 143 configured to output sound. Accordingly, the vehicle 1 may output a sound required to perform the audio functions, video functions, navigation functions, and other additional functions, through the speaker 143. For example, the vehicle 1 may be configured to provide the driver with a route toward the destination using the speaker 143, without being limited thereto. The vehicle 1 may further include an instrument cluster 144, hereinafter referred to as a cluster 144 for descriptive convenience. The cluster 144 may be configured to display a driving speed, an engine revolution per minute (RPM), and a fuel level of the vehicle 1, and the like. The cluster 144 may also be configured to display a driving route in cooperation with the navigation terminal 100 and environmental information of a road such as speed limit information.

The vehicle 1 may further include a head-up display. Head-up displays are classified into windshield head-up displays that project light upon a reflecting mirror and display a variety of information on the front window 87 using light reflected by the reflecting mirror and combiner head-up displays that display a variety of information using a separate screen. Both of the windshield head-up displays and combiner head-up displays may be used as the head-up display of the vehicle 1 according to the present exemplary embodiment. Accordingly, the vehicle 1 may be configured to display a variety of information through the head-up display. Hereinafter, the display 101, the cluster 144, the head-up display, and any other devices used to display a variety of information are referred to as a display device for descriptive convenience.

Meanwhile, a navigation input unit 102 may be disposed at the center fascia 11 located at the center of the dashboard 10. The driver may input various control commands by manipulating the navigation input unit 102 and may also input a destination, and the like. The navigation input unit 102 may be of a hard key type disposed adjacent to the display 101. When the display 101 is implemented using a touch screen type, the display 101 may also operate as the navigation input unit 102. A jog shuttle type or hard key type central input unit 43 may be disposed at a center console 40. The center console 40 may be disposed between a driver's seat 21 and a front passenger's seat 22 and may include a gear manipulation lever 41 and a tray 42. The central input unit 43 may be configured to execute all or some functions of those of the navigation input unit 102.

As illustrated in FIG. 2, the vehicle 1 may include a key cylinder 103 into which an ignition key (IGN key) is inserted. The key cylinder 103 may be disposed at the left side of the steering wheel as illustrated in FIG. 2. However, the position of the key cylinder 103 is not limited thereto, and the key cylinder 103 may also be disposed at the right side of the steering wheel. The IGN key, which will be described later, refers to a key used to start the vehicle 1. For example, the IGN key may have a shape of general keys. Intensity of power supplied to the devices of the vehicle 1 may vary based on position of the IGN key determined after the user inserts the IGN key into the key cylinder 103 and turns the IGN key. In other words, intensities of power supplied to the vehicle 1 may be set differently set based on the position of the IGN key. Additionally, all-time power may be supplied to the vehicle 1 regardless of the position of the IGN key, without being limited thereto.

Alternatively, the IGN key may be implemented using a smart key. The key cylinder 103 may have a shape into which the smart key is inserted as illustrated in FIG. 3. For example, when a smart key is sensed in the vehicle 1, when the user inserts the smart key into the key cylinder 103, or when an engine start button (start button) is pressed or engaged, although not shown in the drawing, different intensities of power may be supplied to the vehicle 1. Meanwhile, rated power required to operate the devices installed within the vehicle 1 may vary. In particular, rated power of the devices may be standardized to allow some of the devices installed in the vehicle 1 to operate or to allow all of the devices of the vehicle 1 operate under certain circumstances. Thus, rated power, i.e., power requirements, required for operating the devices of the vehicle 1 may be the same or different.

According to an exemplary embodiment, power requirements may be classified into Ignition 1 (IGN 1), Ignition 2 (IGN 2), Accessory (ACC), Battery+ (B+), Start (ST), and OFF. IGN 1 refers to power requirements for starting and operating the vehicle 1. For example, IGN 1 may be power requirements for operating an imaging device 110 (e.g., a camera, video camera, or the like) mounted within the vehicle 1 in addition to an engine, an automatic transmission, and a brake. IGN 2 refers to power requirements for operating additional devices used to operate the vehicle 1. For example, IGN 2 may be power requirements for operating a windshield wiper 95, an air conditioner, a sunroof, and the like. ACC refers to power requirements for operating devices embedded for convenience of passengers. For example, ACC may be power requirements for operating an audio device and a cigar jack, and for operating the navigation terminal 100, the display 101, and a speaker. ST refers to power requirements for starting the vehicle 1. B+ refers to power supplied regardless of the position of the IGN key, as all-time power. For example, B+ may be power requirements for operating devices, such as a vehicle interior light, which operates regardless of the position of the IGN key. Voltages and currents corresponding to each of the power requirements may vary.

As described above, the devices installed within the vehicle 1 may have the same or different power requirements. For example, when the user insets the IGN key into the key cylinder 103 and turns the IGN key to an ACC position, the navigation terminal 100 and the audio device may operate with power supplied thereto, although the air conditioner and heating lines of the steering wheel may not operate since suitable power is not supplied thereto. As another example, when the user turns the IGN key to a ST position and starts the vehicle 1, the imaging device 110, the air conditioner, and the heating lines of the steering wheel may operate in addition to the navigation terminal 100 and the audio device.

Referring to FIG. 4, the vehicle 1 may further include the imaging device 110, a position sensor 114, a gyro sensor 115, a rain sensor 116, and a communication unit 120 in addition to the above-described constituent elements. The position sensor 114 may be configured to detect position information of the vehicle 1. Position information refers to information used to identify a position of the vehicle 1. For example, position information may include coordinate information such as longitude, latitude, and altitude, without being limited thereto and may further include any other information used to identify the position of the vehicle 1.

Meanwhile, the position sensor 114 may include a global positioning system (GPS) configured to measure a position of the vehicle 1 using satellites and a differential global positioning system (DGPS) configured to measure the position of the vehicle 1 more accurately, without being limited thereto. In general, position information received from a satellite by a GPS on the Earth's surface has an error. For example, when N GPSes (N>2) are located adjacent to each other, the GPSes have similar errors. In particular, a DGPS may compensate common errors of the N GPSes, thereby acquiring more accurate data. The vehicle 1 may be configured to store position information mapped to speed limit information in the imaging device database 113 by acquiring the position information while detecting the speed limit information using the position sensor 114 and mapping the position information to the speed limit information.

The gyro sensor 115 may be configured to determine direction information of the vehicle 1. In particular, the direction information of the vehicle 1 may include information regarding possible driving directions or a current driving direction of the vehicle 1 from the current position where the vehicle 1 is located. For example, the gyro sensor 115 may be configured to sense angular speed that represents the degree of change in angle with respect to X, Y, and Z axes. Thus, the gyro sensor 115 may be configured to sense the driving direction of the vehicle 1 with respect to a given point or axis. The vehicle 1 according to the present exemplary embodiment may be executed by a controller and may be configured to store direction information mapped to speed limit information in the imaging device database 113 by detecting the direction information while detecting the speed limit information using the gyro sensor 115 and mapping the direction information to the speed limit information.

The rain sensor 116 refers to a sensor used to sense intensity and amount of rain. For example, the rain sensor 116 may be configured to detect or sense a rainfall and automatically operate and adjust speed of the windshield wiper based on sensing results without a driver's manipulation. The communication unit 120 maybe configured to transmit/receive data to/from an external device via a wireless or wired communication network. In particular, the wireless communication network refers to a communication network through which a signal including data may be transmitted/received wirelessly. For example, the wireless communication network may include a 3G network, a 4G network, and a Bluetooth network, without being limited thereto.

The wired communication network refers to a communication network through which a signal including data may be transmitted/received by wire. For example, the wired communication network may include a peripheral component interconnect (PCI), a PCI-express, and a universe serial bus (USB), without being limited thereto. For example, the communication unit 120 may be configured to receive weather information from an external server via a communication network. Accordingly, an imaging device controller 112 may be configured to identify weather of a currently traveling area using the weather information and analyze a cause of an abnormal traffic sign recognition based on the identified result.

As another example, the communication unit 120 may be configured to perform a map data update controlled by the external server via a communication network. In particular, the communication unit 120 may be configured to update the map data upon receipt of a user's command or periodically at predetermined update intervals. Meanwhile, the vehicle 1 may include the imaging device 110. According to an exemplary embodiment, the imaging device 110 may be disposed at a head lining 13 of the vehicle 1 as illustrated in FIGS. 2 and 3. However, the location of the imaging device 110 is not limited thereto and may be disposed at any position suitable for acquiring forward views of the vehicle 1.

Referring to FIG. 4, the imaging device 110 may include an image capture unit 111, an imaging device controller 112, and an imaging device database 113. The image capture unit 111 may be configured to acquire image information regarding a forward view of the vehicle 1. In particular, the forward view refers to a view from the inside of the vehicle 1 through the front window 87. The image information may include objects such as traffic lanes, guard rails, traffic signs, and adjacent vehicles and also various other objects such as trees planted along the road and traffic signals.

The imaging device controller 112 may be configured to operate the imaging device 110. For example, the imaging device controller 112 may be configured to generate a control signal and operate the image capture unit 111 using the generated control signal. The imaging device controller 112 may be implemented using a processing device that performs various calculations and control processes such as a processor embedded in the imaging device 110. Further, the imaging device controller 112 may also be implemented using various known processing devices. In addition, the imaging device controller 112 may be configured to recognize a traffic sign based on image information by image processing and acquire speed limit information of a road indicated by the traffic sign. The traffic sign refers to a traffic sign located on or around a road and indicating speed limit information of the road.

Speed limit information may be the same or different for different roads. The function of the vehicle 1 providing speed limit information is related to the safety of passengers and requires high accuracy. Thus, the imaging device controller 112 may be configured to acquire speed limit information of the road from image information, thereby providing more accurate speed limit information to the user. In addition, the imaging device controller 112 may be configured to store the acquired speed limit information in the imaging device database 113. In particular, the imaging device controller 112 may also be configured to provide speed limit information previously stored in the imaging device database 113 even when the speed limit information is not acquired due to a failure in traffic sign recognition.

Meanwhile, the imaging device controller 112 may be configured to store the acquired speed limit information to which at least one of position information, direction information, time information, and speed information is mapped in the imaging device database 113. Accordingly, the imaging device controller 112 may be configured to analyze a cause of the failure in traffic sign recognition using information stored in the imaging device database 113 and determine whether the speed limit information of the road has changed.

Speed limit information of roads may be changed. For example, speed limit information of roads may be changed due to various reasons such as road expansion or the government's policy on managing speed limits. Thus, the user should be accurately informed of the changed speed limit information. In particular, a map database 140 may not reflect actual environments of roads immediately (e.g., in real time) since the user updates the map database 140 via a communication network or using a storage medium. Thus, the vehicle 1 according to the present exemplary embodiment may be configured to acquire speed limit information of a current road from a traffic sign located on the road, store the acquired speed limit information in the imaging device database 113, and provide the user with the stored speed limit information.

Furthermore, the imaging device controller 112 may be configured to identify whether speed limit information of a road has changed by comparing speed limit information stored in the imaging device database 113 with speed limit information acquired from the traffic sign while driving. Accordingly, when the speed limit information of the road has changed, the imaging device controller 112 may be configured to update the speed limit information stored in the imaging device database 113, thereby providing the changed speed limit information to the user. However, since speed limit information of roads may be changed frequently, there is a risk that the speed limit information stored in the imaging device database 113 does not reflect actual road conditions (e.g., is outdated) Thus, the imaging device controller 112 may be configured to determine whether the traffic sign recognition is performed normally (e.g., without error) via the image capture unit 111. In particular, an abnormal traffic sign recognition may include a misrecognition of the traffic sign, in which the traffic sign is not recognized failing to acquire speed limit information, and also an erroneous recognition of the traffic sign.

The imaging device controller 112 may be configured to determine whether the speed limit information stored in the imaging device database 113 reflects actual driving environments of the road by analyzing the cause of the abnormal traffic sign recognition via the image capture unit 111. Thus, the imaging device controller 112 may be configured to determine whether to display the speed limit information stored in the imaging device database 113 or the speed limit information stored in the map database 140 based on results of the determination. In other words, the imaging device controller 112 may be configured to provide the speed limit information stored in the imaging device database 113 when speed limit information of the road is not acquired from the traffic sign while driving. Instead, the imaging device controller 112 may be configured to select more accurate information by analyzing the cause of the abnormal acquisition of the speed limit information from the traffic sign. As a result, the vehicle 1 according to the present embodiment may be configured to increase a traffic sign recognition rate. For example, the imaging device controller 112 may be configured to determine whether the abnormal traffic sign recognition is caused by simple misrecognition/erroneous recognition or a change in driving environments using various devices installed within the vehicle 1 or information stored in the imaging device database 113.

The misrecognition or erroneous recognition of the traffic sign may be caused by various reasons. For example, when a driver's forward field of vision is narrow due to weather such as heavy rainfall or snowfall, the imaging device 110 may not recognize the traffic sign normally. As another example, the imaging device 110 may not normally recognize the traffic sign during darker lighting conditions (e.g., at night) or by light reflected by a reflector during the day. As another example, the imaging device 110 may not normally recognize the traffic sign under heavy traffic conditions (e.g., during congestion) since the traffic sign may be screened or blocked by adjacent vehicles. The imaging device 110 may not normally recognize the traffic sign due to malfunction of the imaging device 110. In other words, the imaging device 110 may not normally recognize the traffic sign due to various reasons. Particularly, in the above-described examples, there is a low probability that speed limit information of the road, i.e., driving environment, has changed.

However, when the traffic sign is removed from a location at which the traffic sign was previously detected, there is a high probability that speed limit information of the road has changed. Additionally, there is a high probability that speed limit information of the road has changed after several months from a registration time of the speed limit information of the road stored in the imaging device database 113. Accordingly, the imaging device controller 112 may be configured to analyze the cause of the abnormal traffic sign recognition and determine whether to provide the speed limit information stored in the imaging device database 113 or the speed limit information stored in the map database 140 based on the results of the analysis of the abnormal traffic sign recognition.

Meanwhile, the map database 140 may be updated via a communication network or a storage medium. However, the map database 140 may not reflect actual road conditions accurately since the communication network may be overloaded while updating the map database 140 at short intervals and it is inconvenient for the user to update the map database 140 using the storage medium. Thus, the vehicle 1 according to the present exemplary embodiment may be configured to prevent the communication network from being overloaded while updating the map database 140 at short intervals and may improve user convenience by providing more accurate speed limit information.

Hereinafter, a process of analyzing causes of abnormal traffic sign recognition upon determination that a traffic sign is not normally recognized will be described. For example, the imaging device controller 112 may be configured to determine the cause of abnormal traffic sign recognition based on at least one sensing result obtained by the rain sensor 115 between operation of the windshield wiper 95 and weather information received via the communication network. When the rain sensor 115 senses rain or the windshield wiper 95 is being operated, the imaging device controller 112 may be configured to determine that the traffic sign is not normally recognized due to weather conditions.

In addition, as a result of identifying weather information received via the communication network, when rain or snow is detected or when a dense fog advisory is issued in the area where the vehicle 1 is currently traveling, the imaging device controller 112 may be configured to determine that the traffic sign is not normally recognized due to weather conditions. In response to determining that the abnormal traffic sign recognition is caused by weather conditions, the imaging device controller 112 may be configured to determine that there is a low probability that speed limit information of the road has changed and provide the speed limit information stored in the imaging device database 113.

As another example, the imaging device controller 112 may be configured to detect operation of the image capture unit 111 and determine the cause of the abnormal traffic sign recognition based on sensing results thereof. The image capture unit 111 may not acquire image information due to malfunction caused by various reasons. Thus, the imaging device controller 112 may be configured to determine whether the abnormal traffic sign recognition is caused by malfunction of the image capture unit 111 by detecting operation of the image capture unit 111. In response to determining that the abnormal traffic sign recognition is caused by malfunction of the image capture unit 111, the imaging device controller 112 may be configured to determine that there is a low probability that speed limit information of the road has changed and provide the speed limit information stored in the imaging device database 113.

Additionally, the imaging device controller 112 may be configured to determine whether the abnormal traffic sign recognition is caused by an object detected around the road. For example, when a driving speed of the vehicle is less than a predetermined level, the imaging device controller 112 may be configured to determine there is a traffic congestion due to heavy traffic on the road. Thus, the imaging device controller 112 may be configured to determine that the traffic sign is not normally recognized by adjacent vehicles.

In particular, the predetermined level may be set by comparison with the speed limit information stored in the imaging device database 113 or the speed limit information stored in the map database 140. When the vehicle travels at about 50 km/h on a road with a speed limit of about 100 km/h, the imaging device controller 112 may be configured to determine traffic congestion. However, when the vehicle travels at about 50 km/h on a road with a speed limit of about 60 km/h, the imaging device controller 112 may be configured to determine that there is no traffic congestion. In response to determining that speed limit information of the road is not normally recognized since the driving speed is less than the predetermined level, the imaging device controller 112 may be configured to determine that there is a low probability that the speed limit information of the road has changed and provide the speed limit information stored in the imaging device database 113.

As another example, driving speed information of the vehicle 1 may be mapped to speed limit information while detecting the speed limit information and stored in the imaging device database 113 as described above. Thus, when a difference between a driving speed of the vehicle 1 during abnormal traffic sign recognition and a driving speed stored of the vehicle 1 stored in the imaging device database 113 is greater than a predetermined level, the imaging device controller 112 may be configured to determine that the traffic sign is not normally recognized due to traffic congestion or driving speed of the vehicle 1. As a result, the imaging device database 113 may be configured to determine that there is a low probability that speed limit information of the road has changed and provide the speed limit information stored in the imaging device database 113.

When a difference between a registration time of the speed limit information stored in the imaging device database 113 and a time of abnormal traffic sign recognition is greater than a predetermined time period, the imaging device controller 112 may be configured to determine that there is a high probability that the speed limit information stored in the imaging device database 113 is not the latest version (e.g., is out of date) and speed limit information of the road has changed. For example, when it has been about 6 months since the imaging device database 113 stored the speed limit information acquired from the road where the vehicle 1 is currently traveling, the imaging device controller 112 may be configured to determine there is a high probability that the speed limit information stored in the imaging device database 113 does not reflect actual driving environments of the road. Thus, the imaging device controller 112 may be configured to provide the speed limit information stored in the map database 140.

As another example, the imaging device controller 112 may be configured to determine whether the traffic sign is not normally recognized due to brightness or darkness by analyzing a time slot of the abnormal traffic sign recognition on the road where the vehicle 1 is currently traveling. In other words, the imaging device controller 112 may be configured to determine whether there is a high probability that the speed limit information stored in the imaging device database 113 does not reflect current road conditions due to environmental changes of the road. Thus, the imaging device controller 112 may be configured to select information with higher accuracy out of the speed limit information stored in the imaging device database 113 and the speed limit information stored in the map database 140 and display the selected information through at least one of the display 101 and the cluster 144, in corporation with an audio video navigation (AVN) controller 105. However, the imaging device controller 112 does not provide the speed limit information only via the AVN controller 105. The imaging device controller 112 may also be configured to display the speed limit information stored in the imaging device database 113 through at least one of the display 101 and the cluster 144.

Meanwhile, speed limit information may be stored in the imaging device database 113 as described above. In particular, at least one of position information, acquisition time, direction information, and driving speed of the vehicle 1 while detecting speed limit information may be mapped to the speed limit information stored on a road basis and the mapped information may be stored in the imaging device database 113. The position information may be detected by the position sensor 114, and the direction information may be detected by the gyro sensor 115 as described above. The information mapped to the speed limit information stored on a road basis may be used to analyze the cause of abnormal traffic sign recognition. In addition, the imaging device controller 112 may be configured to increase accuracy of speed limit information of the road by acquiring speed limit information from image information acquired while driving and updating the speed limit information stored in the imaging device database 113.

Meanwhile, the imaging device database 113 may be implemented using at least one storage medium selected from the group consisting of flash memory, a hard disk, a multimedia card micro memory, a card-type memory (e.g., secure digital (SD) card or an extreme digital (XD) card), a random access memory (RAM), a static random access memory (SRAM), a read only memory (ROM), an electrically erasable programmable read only memory (EEPROM), a programmable read only memory (PROM), a magnetic memory, a magnetic disc, and an optical disc. However, the imaging device database 113 is not limited thereto and may also be implemented using any other types of memory.

Meanwhile, referring to FIG. 4, the navigation terminal 100 may include a navigation controller 105. The navigation controller 105 may be implemented using a processing device configured to perform various calculations and executing processes such as a processor embedded in the navigation terminal 100. The navigation controller 105 may also be implemented using various other known processing devices. The navigation controller 105 may be configured to operate the vehicle 1. Particularly, the navigation controller 105 may be configured to operate various modules embedded in the navigation terminal 100 and the constituent elements of the vehicle 1 such as the display 101 and the speaker 143.

The navigation controller 105 may further be configured to generate a control signal to operate the constituent elements of the vehicle 1 and execute an operation of each of the constituent elements. For example, the navigation controller 105 may be configured to operate the air conditioner using the control signal and display various information by operating the display 101, without being limited thereto. In addition, the navigation controller 105 may be configured to provide speed limit information to the user by operating various display devices such as the display 101 and the cluster 144 or operating the speaker 143 in cooperation with the imaging device controller 112.

Meanwhile, the navigation controller 105 may be configured to update the map database 140 by operating the communication unit 120. For example, when a map data update is required due to construction of new roads, the navigation controller 105 may be configured to access a wireless communication network via the communication unit 120, receive data from an external server, and update the map database 140. The navigation controller 105 may be configured to update the map database 140 using various other methods.

The map database 140 may be configured to store map data. In this regard, the map data may include roads, buildings, and various other information shown on a map. The map data may further include information regarding a point of interest (POI). The map data may further include environmental information regarding roads included in the map. The environmental information regarding roads refers to information related to driving environments of the roads. For example, the environmental information regarding roads may include information regarding locations of speed bumps and information regarding high traffic-accident areas. In addition, the environmental information regarding roads may include speed limit information of each road. Speed limit information may vary based on the type of the road. For example, speed limit information of highways may be different from that of roads. In addition, the environmental information about roads may be changed. Thus, the map database 140 may be configured to store speed limit information of roads and provide the stored speed limit information to drivers.

Meanwhile, the map database 140 may be implemented using at least one storage medium selected from the group consisting of flash memory, a hard disk, a multimedia card micro memory, a card-type memory (e.g., secure digital (SD) card or an extreme digital (XD) card), a random access memory (RAM), a static random access memory (SRAM), a read only memory (ROM), an electrically erasable programmable read only memory (EEPROM), a programmable read only memory (PROM), a magnetic memory, a magnetic disc, and an optical disc. However, the map database 140 is not limited thereto and may also be implemented using any other types of memory. The map database 140 may be configured to store map data of all areas or specific areas. In particular, the vehicle 1 may use required map data received from the external server via the communication unit 120.

Meanwhile, referring to FIG. 5, the vehicle 1 may include a controller 150. The controller 150 may be implemented using a processing device configured to perform various calculations and control processes such as a processor. The controller 150 may also be implemented using various other known processing devices. Operations performed by the controller 150 may include those of the imaging device controller 112 and the navigation controller 105 illustrated in FIG. 4, and thus detailed descriptions thereof will not be given. According to an exemplary embodiment, the imaging device controller 112 and the navigation controller 105 may be integrated in a system on chip embedded in the navigation terminal 100. In other words, the controller 150 may be embedded in the navigation terminal 100 and may be configured to perform the overall operation of the above-described constituent elements.

Figure 6:
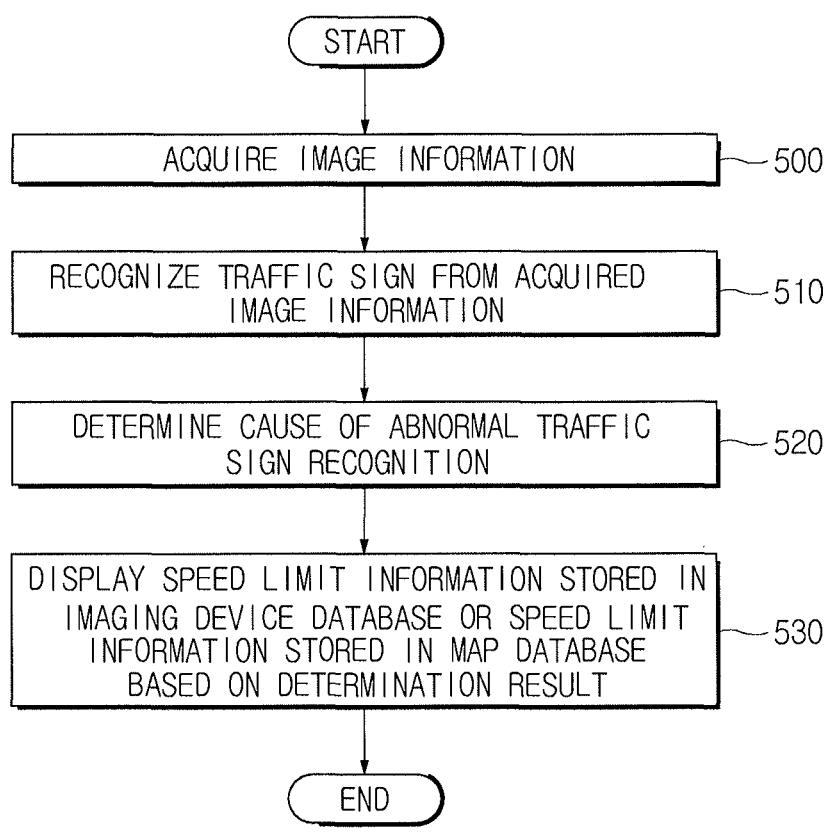
FIG. 6 is an operation flowchart of a vehicle illustrating a procedure of displaying speed limit information according to an exemplary embodiment of the present invention.
Figure 7:
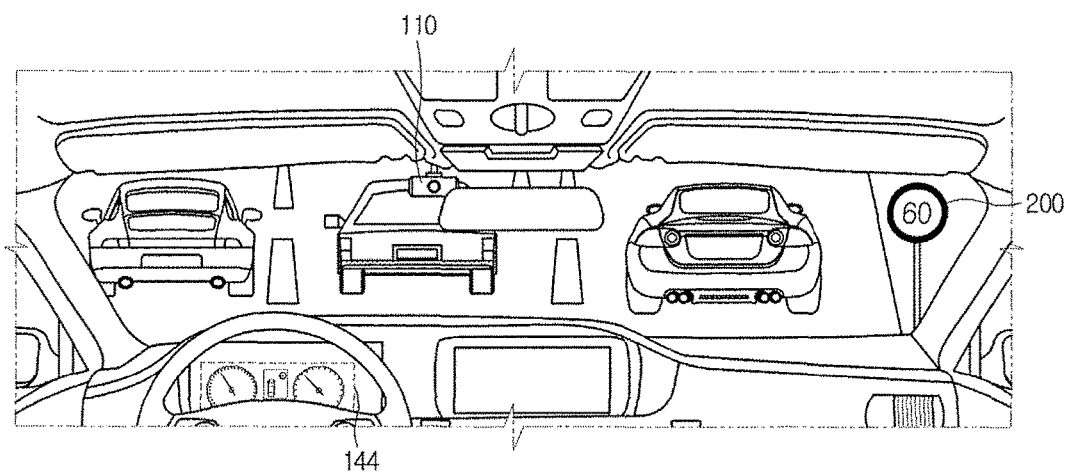
FIG. 7 is a diagram illustrating a recognized traffic sign located on a driving route according to an exemplary embodiment of the present invention.
Figure 8:
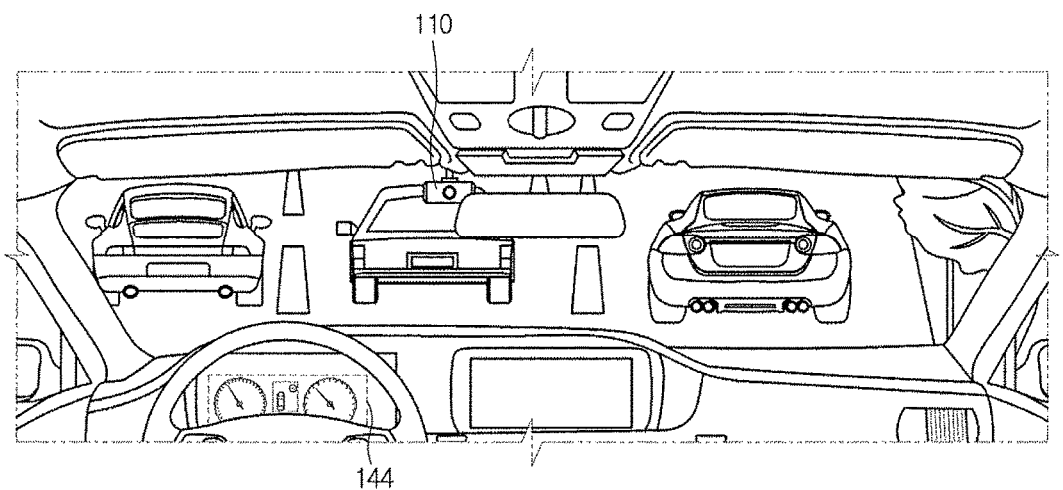
FIG. 8 is a diagram illustrating when a traffic sign located at a driving route is not recognized due to an object according to an exemplary embodiment of the present invention.
Figure 9:
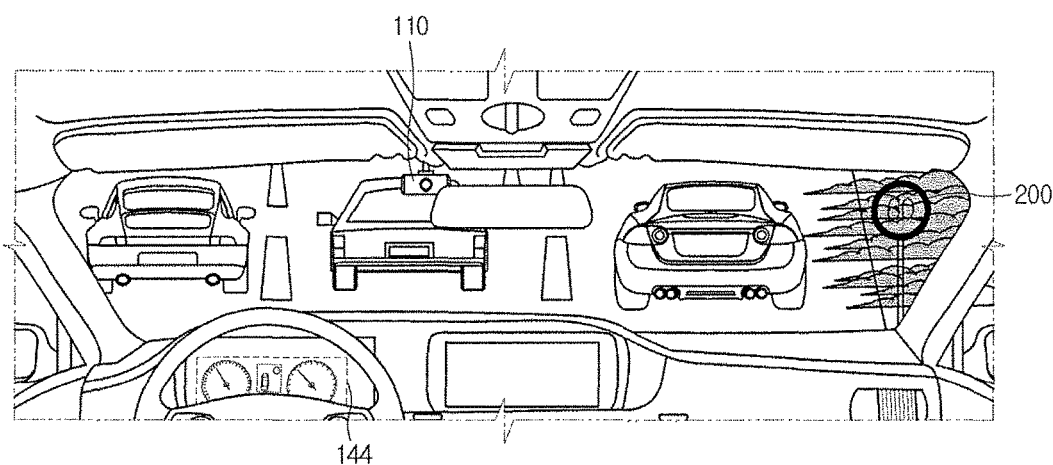
FIG. 9 is a diagram illustrating when a traffic sign located at a driving route is not recognized due to bad weather according to an exemplary embodiment of the present invention.
Figure 10:
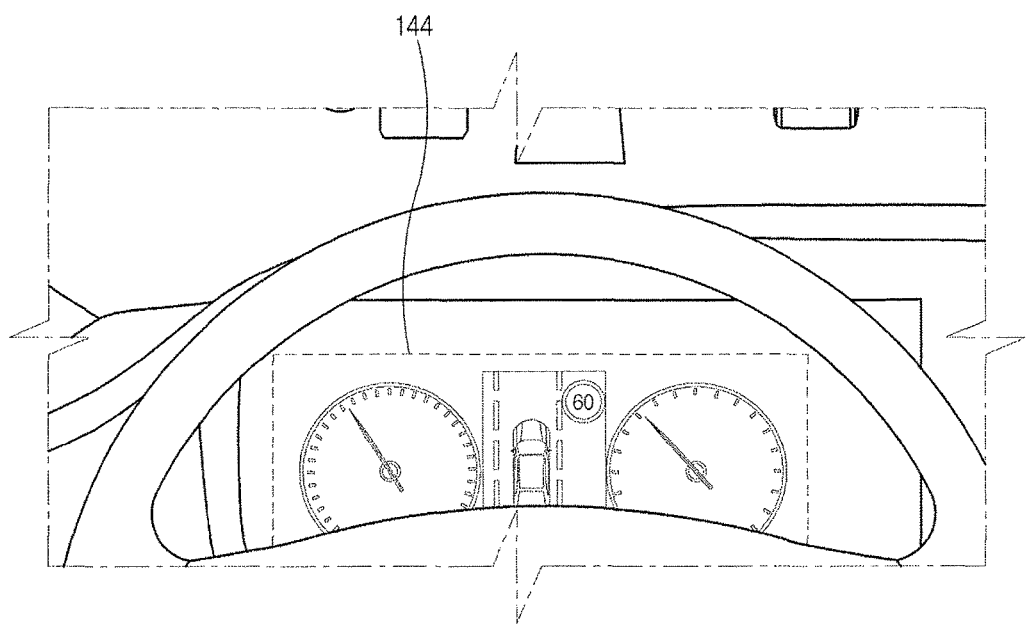
FIG. 10 is a diagram illustrating displaying which speed limit information through a cluster according to an exemplary embodiment of the present invention.
Figure 11:
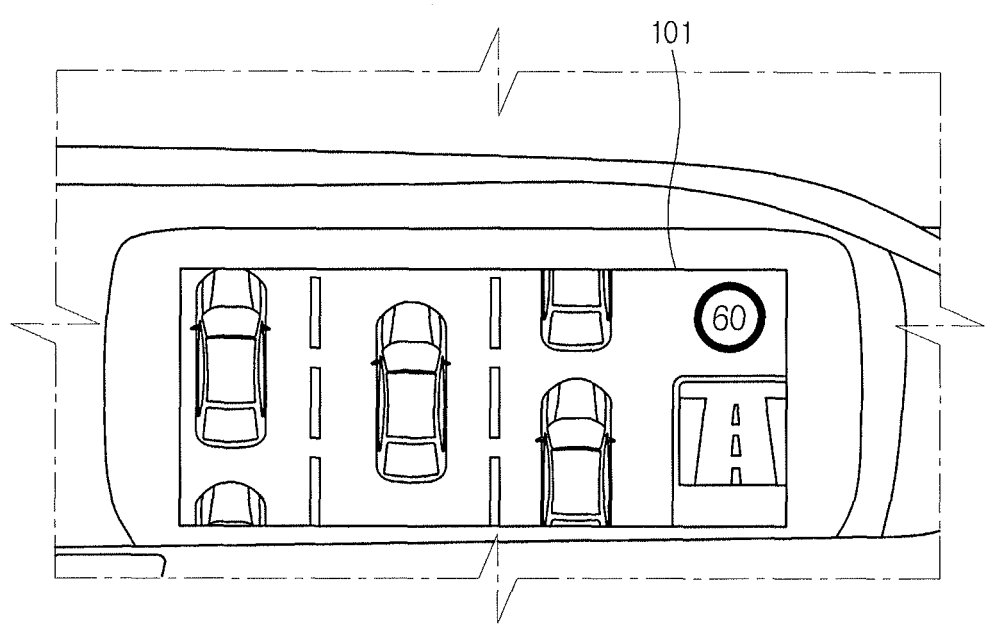
FIG. 11 is a diagram illustrating displaying speed limit information is displayed through a display according to an exemplary embodiment of the present invention.

Hereinafter, operation of the vehicle will be described briefly. FIG. 6 is an operation flowchart of a vehicle illustrating a procedure of displaying speed limit information according to an exemplary embodiment. FIG. 7 is a diagram illustrating a recognized traffic sign located at a driving route according to an exemplary embodiment. FIG. 8 is a diagram illustrating when a traffic sign located at a driving route is not recognized due to an object according to an exemplary embodiment. FIG. 9 is a diagram illustrating when a traffic sign located at a driving route is not recognized due to bad weather according to an exemplary embodiment. FIG. 10 is a diagram illustrating speed limit information displayed through a cluster according to an exemplary embodiment. FIG. 11 is a diagram illustrating speed limit information displayed through a display according to an exemplary embodiment. Hereinafter, these drawings will be described together to avoid duplication of description.

Referring to FIG. 6, the vehicle may be configured to acquire image information by capturing images of a forward view by using an imaging device (500). The image information may include objects such as traffic lanes, guard rails, traffic signs, and adjacent vehicles and also various other objects such as trees planted along the road and traffic signals, as described above. In particular, the vehicle may be configured to recognize the traffic sign from the image information by image processing (510) and acquire speed limit information indicated the traffic sign.

Referring to FIG. 7, for example, an imaging device 110 may be disposed at a head lining of the vehicle. In particular, the imaging device 110 may be configured to acquire image information by capturing images of the forward view of the vehicle. The image information may include a traffic sign 200 in addition to traffic lanes and other vehicles adjacent to the vehicle. The vehicle may be configured to recognize the traffic sign 200 by image processing and determine driving environments of the road by detecting speed limit information indicated by the traffic sign 200. Particularly, the traffic sign may not be normally recognized due to various reasons as described above.

Referring to FIG. 8, the vehicle may not normally recognize a traffic sign screened by a tree. Additionally, referring to FIG. 9, the vehicle may not normally recognize the traffic sign due to narrow field of vision of the driver caused by dense fog. In other words, as illustrated in FIGS. 8 and 9, in response to determining that the abnormal traffic sign recognition is caused by misrecognition of the traffic sign rather than the change in speed limit information of the road, the vehicle may be configured to display the speed limit information stored in an imaging device database. Thus, in response to determining that the traffic sign is not normally recognized, the vehicle may be configured to determine the cause of the abnormal traffic sign recognition (520).

Accordingly, the vehicle may be configured to display either the speed limit information stored in the imaging device database or speed limit information stored in a map database based on the determination (530). In other words, the vehicle may be configured to analyze causes of the abnormal traffic sign recognition and display the speed limit information stored in the imaging device database upon determination that the abnormal traffic sign recognition is caused by misrecognition/erroneous recognition. Alternatively, in response to determining that there is a high probability that speed limit information of the road has changed due to a change in driving environments of the road based on results of the analysis, the vehicle may be configured to display the speed limit information stored in the map database.

In other words, the vehicle may be configured to determine whether speed limit information of the road has changed by analyzing causes of the abnormal traffic sign recognition via various analysis methods and provide more accurate speed limit information to the user based on results of the analysis. According to an exemplary embodiment, in response to determining that the abnormal traffic sign recognition is caused by misrecognition/erroneous recognition, the vehicle may be configured to display the speed limit information stored in a database through a cluster or a display. The vehicle may also be configured to provide the user with speed limit information through various display devices used to display a variety of information such as a head-up display. For example, the vehicle may be configured to display a speed limit of a road where the vehicle is currently travelling as about 60 km/h through the cluster 144 as illustrated in FIG. 10 or display the speed limit of about 60 km/h through the display 101 as illustrated in FIG. 11.

Figure 12:
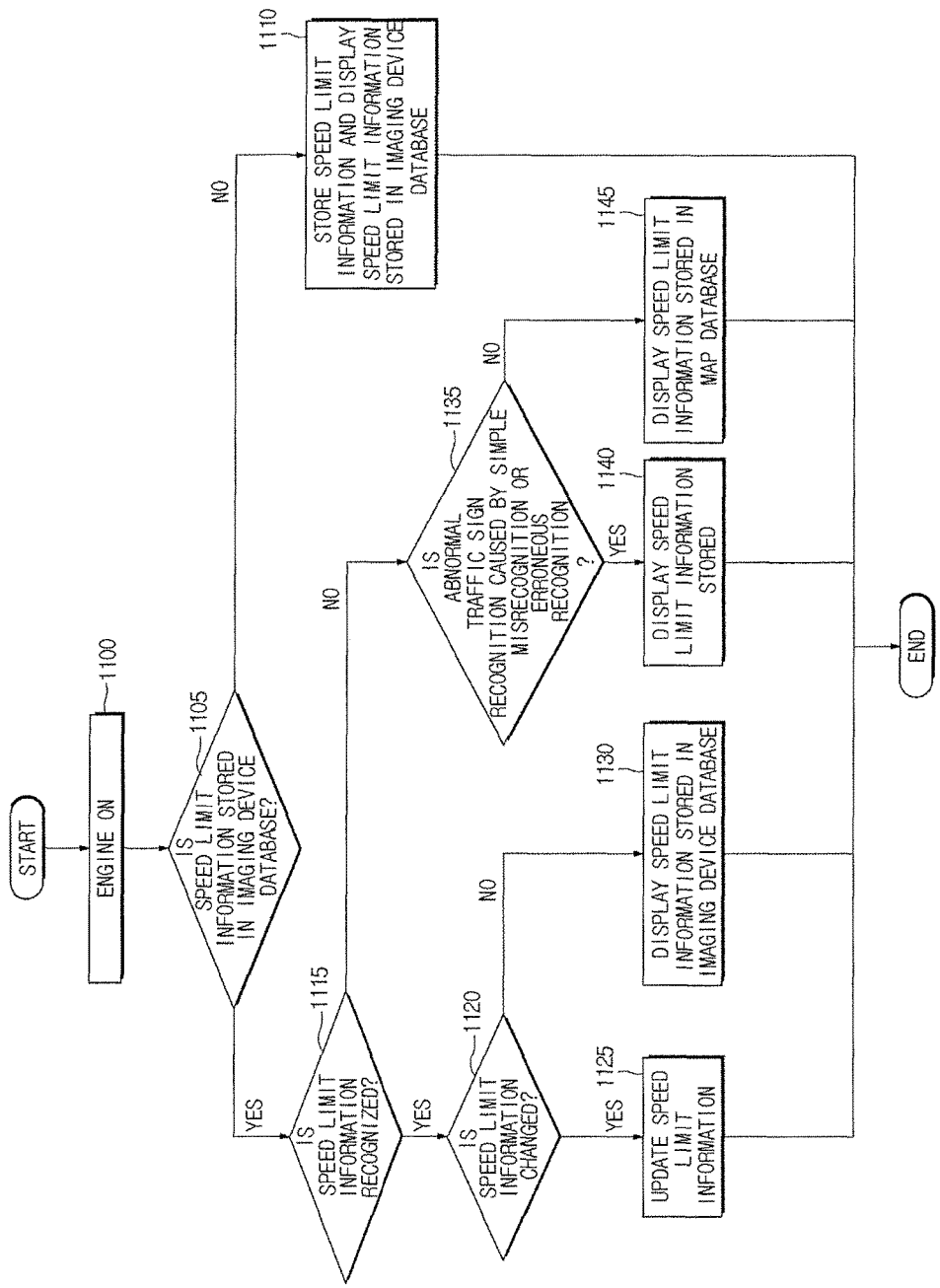
FIG. 12 is an operation flowchart of a vehicle illustrating a procedure of registering or correcting speed limit information based on whether speed limit information is stored in a imaging device database in a vehicle according to an exemplary embodiment of the present invention.

Hereinafter, operation of the vehicle will be described in detail. FIG. 12 is an operation flowchart of a vehicle illustrating a procedure of registering or correcting speed limit information based on whether speed limit information is stored in a imaging device database in a vehicle according to an exemplary embodiment. The vehicle may be started (1100). As described above, power supplied to the vehicle may be set differently based on the position of the IGN key. When the user starts the vehicle by turning the IGN key, a navigation terminal and an imaging device may operate. The vehicle may be configured to search the imaging device database to determine whether speed limit information of roads located along a driving route is stored in the imaging device database (1105). When speed limit information of a road where the vehicle is currently travelling is not stored in the imaging device database based on search results, the vehicle may be configured to acquire speed limit information from the road using the imaging device, store the speed limit information in the imaging device database, and display the stored speed limit information through a display device (1110).

When speed limit information of the road where the vehicle is currently travelling is stored in the imaging device database based on the search results, the vehicle may be configured to recognize a traffic sign of the road using the imaging device (1115). In particular, the vehicle may be configured to determine whether the speed limit information of the road has changed by comparing the speed limit information acquired from the traffic sign with the speed limit information stored in the imaging device database (1120). When the speed limit information of the road has changed, the vehicle may be configured to update the speed limit information stored in the imaging device database as a latest version (1125). Further, when the speed limit information of the road has not changed, the vehicle may be configured to display the speed limit information stored in the imaging device database (1130).

Meanwhile, when the traffic sign of the road is not normally recognized using the imaging device, the vehicle may be configured to determine whether the abnormal traffic sign recognition is caused by misrecognition or erroneous recognition (1135). The vehicle may be configured to determine whether the abnormal traffic sign recognition is caused by misrecognition or erroneous recognition using a device of the vehicle or information stored in the imaging device database. Additionally, the vehicle may not normally recognize the traffic sign due to causes such as weather conditions, driving speed, time slot, and narrow field of vision. In particular, the vehicle may be configured to determine that the abnormal traffic sign recognition is caused by misrecognition rather than the change in the speed limit information of the road and display the speed limit information stored in the imaging device database (1140). In addition, when the traffic sign is not normally recognized due to malfunction of the imaging device, the vehicle may be configured to determine that the abnormal traffic sign recognition is caused by misrecognition rather than the change in the speed limit information of the road and display the speed limit information stored in the imaging device database.

Meanwhile, in response to determining that the cause of the abnormal traffic sign recognition is not the misrecognition or erroneous recognition, the vehicle may be configured to determine that the speed limit information stored in the imaging device database may not reflect actual road conditions of the current road and display speed limit information stored in a map database (1145). In other words, the vehicle according to an exemplary embodiment of the present disclosure may be configured to store speed limit information of roads in the imaging device database and provide previously stored speed limit information although speed limit information of a current road is not acquired by the imaging device in real time. In addition, the vehicle may be configured to continuously perform traffic sign recognition using the imaging device while driving and update the imaging device database upon determination that speed limit information of roads has changed.

Furthermore, when the traffic sign is not normally recognized, the vehicle may be configured to analyze causes of the abnormal traffic sign recognition and provide speed limit information with greater accuracy selected between speed limit information stored in the imaging device database and speed limit information stored in the map database. Thus, the vehicle according to the present exemplary embodiment may increase accuracy of the speed limit information.

The method according to the above-described exemplary embodiments may be embodied in the form of program instructions, which may be performed through various computer means, and may be written in computer-readable recording medium. The computer-readable medium may include program instructions, data files, data structures, and the combination thereof. The program instructions stored in the storage medium may be designed and configured specifically for an exemplary embodiment or can be publically known and available to those who are skilled in the field of computer software. Examples of the computer-readable recording medium can include magnetic media, such as a hard disk, a floppy disk, and a magnetic tape, optical media, such as CD-ROM and DVD, magneto-optical media such as floptical disk, and hardware devices such as ROM, RAM, and flash memory, which are specifically configured to store and run program instructions.

Examples of program instructions include both machine code produced by a compiler, and high-level language code that may be executed on the computer using an interpreter. The hardware devices may be configured to act as one or more software modules in order to perform the operations of the above-described embodiments, or vice versa.

Although a few exemplary embodiments of the present disclosure have been shown and described, it would be appreciated by those skilled in the art that changes may be made in these exemplary embodiments without departing from the principles and spirit of the disclosure, the scope of which is defined in the claims and their equivalents. For example, if the above-described techniques are performed in a different order and/or the above-described systems, structures, devices, circuits, or components are combined in different ways or substituted by other components or their equivalents, the same results may be achieved.

What is claimed is:

1. A vehicle, comprising:
   an image capture unit configured to acquire image information by imaging a forward view of the vehicle;
   an imaging device controller configured to determine whether a traffic sign that indicates speed limit information of a road is recognized abnormally based on the acquired image information; and
   a navigation controller configured to display either speed limit information of the road stored in a imaging device database or speed limit information of the road stored in a map database in response to determining that the traffic sign is recognized abnormally,
   wherein the imaging device controller is further configured to detect a cause of the abnormal traffic sign recognition and determine whether to display the speed limit information of the road stored in the imaging device database based on the detected cause.

2. The vehicle according to claim 1, wherein the imaging device controller is configured to analyze the cause of the abnormal traffic sign recognition based on at least one selected from the group consisting of: an operation of a windshield wiper, a sensing result of a rain sensor, and weather information received via a communication network.

3. The vehicle according to claim 1, wherein the imaging device controller is configured to analyze the cause of the abnormal traffic sign recognition based on at least one selected from the group consisting of: operation of a head lamp and time information when the traffic sign recognition is recognized abnormally.

4. The vehicle according to claim 1, wherein the imaging device controller is configured to determine whether the abnormal traffic sign recognition is caused by at least one selected from the group consisting of: an object located around the road and malfunction of an imaging device.

5. The vehicle according to claim 1, wherein the imaging device controller is configured to analyze the cause of the abnormal traffic sign recognition based on a driving speed of the vehicle.

6. The vehicle according to claim 1, wherein at least one selected from the group consisting of: position information, speed information, time information, and direction information of the vehicle at the time of acquiring speed limit information of the road is mapped to the speed limit information on a road basis and stored in the imaging device database.

7. The vehicle according to claim 6, wherein the imaging device controller is configured to analyze the cause of the abnormal traffic sign recognition by comparing time information stored in the imaging device database and time information when the traffic sign is recognized abnormally.

8. The vehicle according to claim 1, wherein the navigation controller is configured to determine whether the speed limit information of the road has changed by analyzing a cause of the abnormal traffic sign recognition and display either the speed limit information stored in the imaging device database or the speed limit information stored in the map database through at least one selected from the group consisting of: a head-up display, a display, and an instrument cluster based on results of the determination.

9. A vehicle, comprising:
an imaging device database in which speed limit information of a road is stored;
an imaging device controller configured to determine whether the speed limit information of the road stored in the imaging device database has changed when speed limit information is acquired abnormally from a traffic sign located around the road while driving; and
a display device configured to display either the speed limit information stored in the imaging device database or speed limit information stored in a map database based on results of the determination,
wherein the imaging device controller is further configured to detect a cause of the abnormal speed limit information acquisition and determine whether the speed limit information stored in the imaging device database has changed based on the detected cause.

10. The vehicle according to claim 9, wherein at least one selected from the group consisting of: position information, speed information, time information, and direction information of the vehicle at the time of acquiring speed limit information of the road is mapped to the speed limit information on a road basis and stored in the imaging device database.

11. The vehicle according to claim 9, wherein the imaging device controller is configured to analyze the cause of the abnormal acquisition of the speed limit information based on at least one selected from the group consisting of: an operation of a windshield wiper, a sensing result of a rain sensor, and weather information received via a communication network and determine whether the speed limit information stored in the imaging device database has changed based on results of the analysis.

12. The vehicle according to claim 9, wherein the imaging device controller is configured to analyze the cause of the abnormal acquisition of the speed limit information based on at least one selected from the group consisting of: an operation of a head lamp and time information when the acquisition of the speed limit information is acquired abnormally from the traffic sign located around the road and determine whether the speed limit information stored in the imaging device database has changed based on results of the analysis.

13. The vehicle according to claim 9, wherein the imaging device controller is configured to analyze the cause of the abnormal acquisition of the speed limit information based on at least one selected from the group consisting of: an object located around the road and malfunction of an imaging device and determine whether the speed limit information stored in the imaging device database has changed based on results of the analysis.

14. The vehicle according to claim 9, wherein the imaging device controller is configured to analyze the cause of the abnormal acquisition of the speed limit information based on a driving speed of the vehicle and determine whether the speed limit information stored in the imaging device database has changed based on results of the analysis.

15. The vehicle according to claim 10, wherein the imaging device controller is configured to analyze the cause of the abnormal acquisition of the speed limit information by comparing time information when the speed limit information is stored in the imaging device database with time information when the speed limit information is acquired abnormally and determine whether the speed limit information stored in the imaging device database has changed based on results of the analysis.

16. The vehicle according to claim 10, wherein the navigation controller is configured to analyze the cause of the abnormal acquisition of the speed limit information and display either the speed limit information stored in the imaging device database or the speed limit information stored in the map database through at least one selected from the group consisting of: a head-up display, a display, and an instrument cluster based on results of the analysis.

17. A method of controlling a vehicle, comprising:
acquiring, by an imaging device, image information by imaging a forward view of the vehicle;
determining, by a controller, whether a traffic sign that indicates speed limit information of a road is recognized abnormally from the acquired image information; and
operating, by the controller, a device installed within the vehicle to display either speed limit information stored in a imaging device database or speed limit information stored in a map database in response to determining that the traffic sign is recognized abnormally,
wherein the determination of whether the traffic sign is recognized abnormally is performed by detecting a cause of the abnormal traffic sign recognition and determining whether to display the speed limit information stored in the imaging device database based on the detected cause.

* * * * *